Aug. 22, 1961  S. B. ROSS  2,997,145
WHEEL HUB FOR DISC TYPE COASTER BRAKES
Filed July 25, 1960
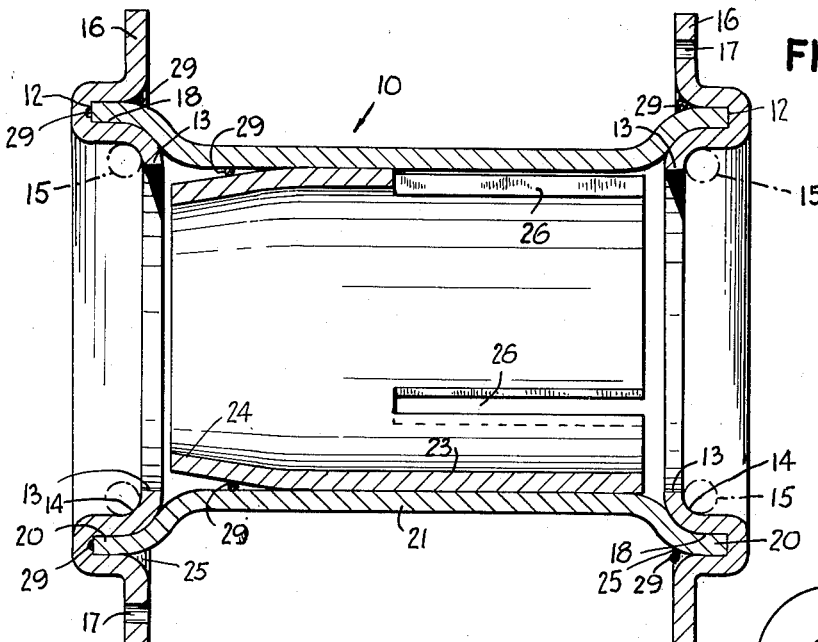
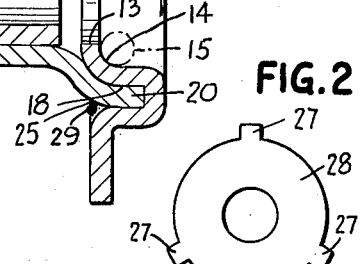
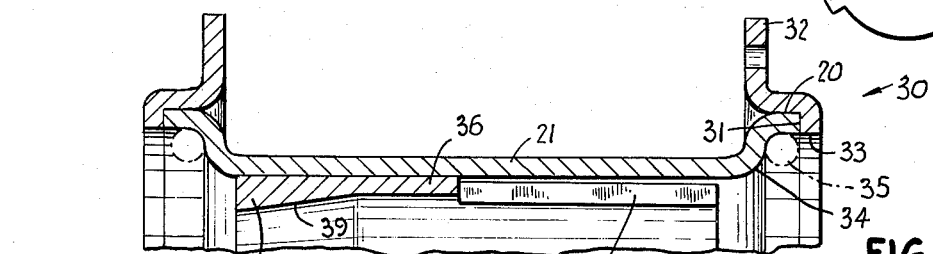
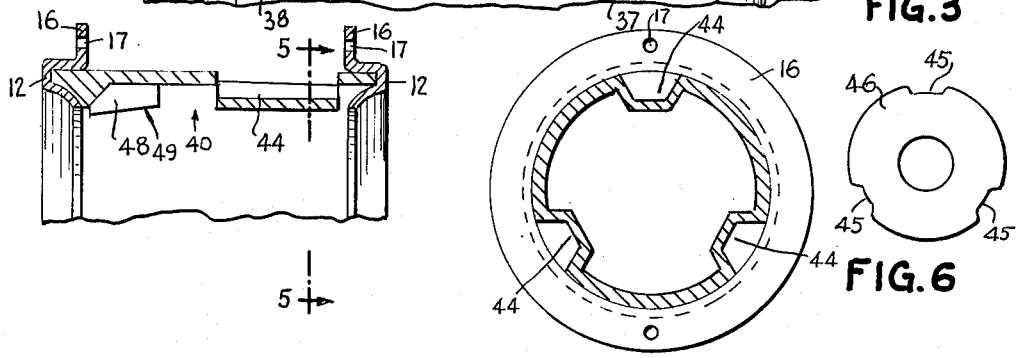
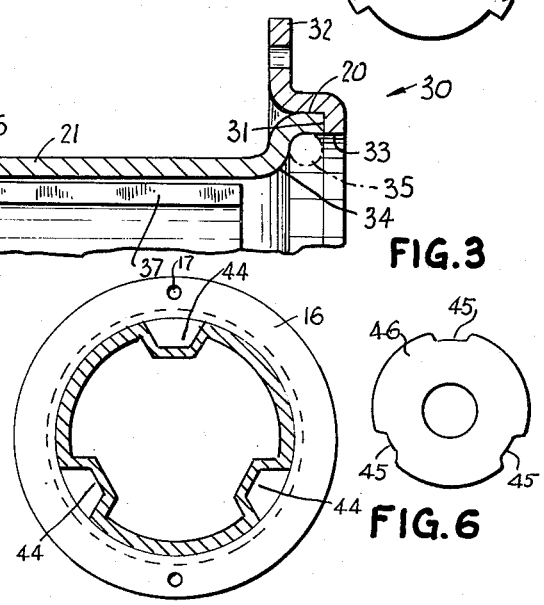
FIG. 1
FIG. 2
FIG. 3
FIG. 4
FIG. 5
FIG. 6
INVENTOR.
SHERWOOD B. ROSS
BY
*Percy Freeman*
ATTORNEY

United States Patent Office 2,997,145
Patented Aug. 22, 1961

2,997,145
WHEEL HUB FOR DISC TYPE COASTER BRAKES
Sherwood B. Ross, 300 Cambridge Ave., Garden City, N.Y.
Filed July 25, 1960, Ser. No. 45,183
12 Claims. (Cl. 192—6)

This invention relates to bicycles and, more particularly, to certain elements of a coaster brake assembly therefore. Ordinarily, disc type coaster brakes require a cast or otherwise machined hub which is expensive to manufacture, requires heavy casting and machining equipment, and the like. It is, therefore, an object of the present invention to provide a wheel hub for disc type coaster brakes which is extremely simple in construction, can be formed by conventional stamping apparatus, and which can be manufactured at a greatly reduced cost.

Still another object of the present invention is to provide a wheel hub for disc type coaster brakes having a number of preformed parts which can be conveniently secured together, such as by brazing, and which will perform all the functions and purposes of conventional coaster brake hubs.

Still an additional object of the present invention is to provide a method of manufacturing wheel hubs for disc type coaster brakes which will materially reduce the time for fabrication, finishing, and assembling, all with a minimum cost, handling, and treatment.

All of the foregoing and still further objects and advantages of this invention will become apparent from a study of the following specification, taken in connection with the accompanying drawing, wherein:

FIG. 1 is a longitudinal cross-sectional view of a wheel hub for disc type coaster brakes made in accordance with one form of the present invention.

FIG. 2 is a plan view of a friction disc of the type used in disc type coaster brakes for assembly with the hub shown in FIG. 1.

FIG. 3 is a fragmentary longitudinal cross-sectional view of a slightly modified form of construction.

FIG. 4 is a side elevational view, partly in section of still a further embodiment of the present invention.

FIG. 5 is a transverse cross-sectional view taken along line 5—5 of FIG. 4.

FIG. 6 is a plan view of a friction disc of the type used in disc type coaster brakes for assembly with the hub shown in FIGS. 4 and 5.

Referring now to the drawing, and more particularly to FIGS. 1 and 2 thereof, a wheel hub 10 made in accordance with one form of the present invention is shown to include a pair of flanged discs 12, each having a central opening 13 around which a bearing seat 14 is formed. These bearing seats 14 thus rotatably receive race type ball bearing assemblies 15 within the outer confines of the disc 12.

Each such disc 12 is further provided with a redially outwardly extending spoke flange 16 having apertures 17 through which the ends of the wheel spokes may be received. Each disc 12 is further provided with a recess, in the form of an annular groove 18 intermediate the bearing seat and the spoke flange, which grooves face toward each other so as to receive the outwardly enlarged ends 20 of a main hub tube 21.

The hub tube 21 is of generally uniform cylindrical cross-sectional configuration having an inside diameter substantially equal to the diameter of each of the central openings 13 of the flanged discs 12. The outermost ends 20 of the hub tube 21 are enlarged so as to closely fit within the annular grooves of the flanged discs 12.

An inner sleeve 23, having one constricted end defining an inwardly facing tapered power transmission clutch surface 24, is provided with a plurality of circumferentially spaced longitudinally extending slots 26 at its opposite end which serve as guides for the radially outwardly extending tabs 27 of friction discs 28 of the general type ordinarily used in disc type coaster brakes.

In the fabrication of the device shown in FIG. 1, the flanged discs 12 may be conveniently formed by stamping the required surfaces and openings in sheet metal. The main hub tube 21 may be formed from seamless tubing by enlarging the ends 20 thereof to provide the proper profile, or by stamping offset ends in sheet metal and subsequently rolling it into the required tube form. The inner sleeve 23 may also be formed from seamless tubing by tapering the one end 24 thereof, and by stamping the longitudinal slots 26 in the opposite end, or by stamping flat stock to provide such slots and taper when the flat stock is subsequently rolled into the required tubular form. It will, therefore, be recognized that all of the component parts of the brake hub unit 10 are formed by conventional machine methods into four engageable elements, which elements 12, 12, 21, 23, may be integrally connected together, such as by brazing or spot welding. An extremely effective method of assembly may be carried out by brazing the parts together in the following manner. By placing the flanged disc 12 to the right of FIG. 1 in a horizontal position upon a flat supporting surface, and inserting the respective end 20 of the hub tube 21 vertically within the groove 18, a first brazing wire 29 may be placed within the annular space 25 formed between the hub tube and the respective disc 12. The inner sleeve 23 may then be assembled with the hub tube 21 and a brazing wire 29 placed within the space between the tapered end 24 of the inner sleeve 23 and the associated end of the tube 21. Finally, after placing a brazing wire 29 upon the opposite free end of the hub tube 21 prior to assembling the other flanged disc 12 therewith, the assembled parts may be placed within a brazing oven in the erect position so that the brazing wire upon melting will flow naturally by gravity into the interstices between the respective parts, all with a minimum loss of brazing material and with an effective bond between these parts.

Reference is now made to FIG. 3 of the drawing which illustrates a slightly modified form of construction in which the flanged discs 32 are of slightly less complicated construction. Each of the flanged discs 32 is provided with a central opening 33 and a recess that is in the form of a well 31 intermediate the opening 33 and the spoke flange portion. This well 31 receives the enlarged end 20 of the hub tube 21 in a manner similar to that hereinbefore described. However, in this embodiment, the outwardly facing surface 34 of the hub tube 21 defines the bearing seat for the race type ball bearing unit 35. The inner sleeve may be identical to that hereinbefore described, or may be of a slightly modified form 36 in which the inwardly facing tapered clutch surface 39 formed at the one end thereof is accompanied by a longitudinally inwardly upsetting of the one end of the sleeve so as to produce a section 38 of generally wedge-shaped cross-sectional configuration which will fill the space between the tapered surface 39 and the facing surface of the main hub 21. The opposite end of the inner sleeve 36 is provided with the required longitudinally extending and circumferentially spaced apart slots 37 which serve as guides for the radially outwardly extending tabs 27 of the friction discs 28.

With reference now to FIGS. 4 and 5 of the drawings, still a further modified form of construction 40 is shown, in which a pair of flanged discs 12 are used in conjunction with a composite hub tube and inner sleeve member. The hub tube, which may be similar to that hereinbefore described, is further treated, such as by stamping, to provide a plurality of circumferentially spaced apart and radially inwardly projecting wedge sections 48 at one end which define a segmental tapered power transmission clutch surface 49 similar to the tapered surface formed by the one end of each of the previously described inner sleeves 23, 36. The opposite end of the hub tube is also provided with a plurality of circumferentially spaced apart and radially inwardly extending longitudinal rails or ribs 44 that serve as guide means for a slightly modified type of friction disc 46 in which the conventional tabs are replaced by a plurality of circumferentially spaced apart and radially inwardly extending indents 45 that receive the inwardly projecting rails 44 of the formed hub tube.

It will now be appreciated that this composite hub tube and inner sleeve eliminates the necessity of a separate inner sleeve, thus reducing the total number of finished parts to be assembled, and providing means for accommodating the modified form of friction discs 46.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent is:

1. A wheel hub for disc type coaster brakes comprising, in combination, a main hub tube, a pair of flanged discs, one of said discs being secured to each end of said tube, a separate sleeve snugly fitting and secured within said hub tube to define essentially a two-ply structure, one end of said sleeve having a radially inwardly tapered power transmission clutch surface, the opposite end of said sleeve having guide means for slidable non-rotatable engagement with a plurality of brake friction discs, and means integrally securing said tube to said flanged discs.

2. A wheel hub for disc type coaster brakes as set forth in claim 1, wherein each one of said flanged discs includes a formed plate having a central opening and a radially outwardly flared spoke flange, and each said flanged disc intermediate said central opening and said spoke flange defining an annular recess receiving one end of said hub tube therewithin.

3. A wheel hub for disc type coaster brakes as set forth in claim 2, wherein said recess comprises a reentrant groove opening outwardly from one side, and the opposite side of said flanged disc defines an annular bearing seat intermediate said central opening and said groove.

4. A wheel hub for disc type coaster brakes as set forth in claim 2, wherein said recess comprises a shallow well opening outwardly from one side of said disc and being contiguous with said central opening.

5. A wheel hub for disc type coaster brakes as set forth in claim 2, wherein said hub tube comprises a substantially cylindrical member, and each end of said hub tube is radially outwardly enlarged to form a terminal received within said annular recesses of said flanged discs.

6. A wheel hub for disc type coaster brakes as set forth in claim 1, wherein said one end of said sleeve is tapered radially inwardly in spaced relationship with said hub tube.

7. A wheel hub for disc type coaster brakes as set forth in claim 6, wherein said one end of said sleeve is upset to define said tapered surface and to fill the space between said tapered surface and the interior of said hub tube.

8. A wheel hub for disc type coaster brakes as set forth in claim 1, wherein said guide means comprises a plurality of circumferentially spaced apart and longitudinally extending slots in said opposite end of said sleeve.

9. A wheel hub for disc type coaster brakes comprising, in combination, a main hub tube, a pair of flanged discs, one of said discs being secured to each end of said tube, one end of said tube having a plurality of radially inwardly projecting wedge sections defining tapered power transmission clutch surfaces, and the opposite end of said tube having a plurality of spaced apart radially inwardly projecting longitudinal rails defining guide means for slidable non-rotatable engagement with a plurality of brake friction discs, and means integrally securing said tube to said flanged discs.

10. A wheel hub for disc type coaster brakes comprising in combination a main hub flanged at both ends and of uniform wall thickness throughout, a sleeve of uniform wall thickness snugly fitting within said hub tube, one end of said sleeve having a radially inwardly tapered power transmission clutch surface, the opposite end of said sleeve having guide means for slidable non-rotatable engagement with a plurality of brake friction discs, and means integrally securing said sleeve to said hub tube.

11. A wheel hub for disc type coaster brakes comprising in combination a main hub flanged at both ends, a sleeve snugly fitting within said hub tube, one end of said sleeve having a power transmission clutch surface, the opposite end of said sleeve having guide means for slidable non-rotatable engagement with a plurality of brake friction discs, and means integrally securing said sleeve to said hub tube.

12. A wheel hub for disc type coaster brakes comprising in combination a main hub flanged at both ends, a sleeve snugly fitting within said hub tube, one end of said sleeve having a power transmission clutch surface, and means integrally securing said sleeve to said hub tube.

References Cited in the file of this patent

UNITED STATES PATENTS

| 2,837,187 | Hood | June 3, 1958 |
| 2,914,152 | Gleasman | Nov. 24, 1959 |